Nov. 18, 1952 J. LUDEMA 2,618,349
LATERALLY ADJUSTABLE ENDLESS TRACKS FOR TRACTORS
Filed May 20, 1949 4 Sheets-Sheet 1

INVENTOR
JOE LUDEMA
By
ATTORNEY

Nov. 18, 1952 J. LUDEMA 2,618,349
LATERALLY ADJUSTABLE ENDLESS TRACKS FOR TRACTORS
Filed May 20, 1949 4 Sheets-Sheet 3

INVENTOR
JOE LUDEMA
BY
ATTORNEY

Nov. 18, 1952          J. LUDEMA          2,618,349

LATERALLY ADJUSTABLE ENDLESS TRACKS FOR TRACTORS

Filed May 20, 1949          4 Sheets-Sheet 4

INVENTOR
JOE LUDEMA
BY
*Glenn B. Evans*
ATTORNEY

UNITED STATES PATENT OFFICE 2,618,349

LATERALLY ADJUSTABLE ENDLESS TRACKS FOR TRACTORS

Joe Ludema, Hudsonville, Mich.

Application May 20, 1949, Serial No. 94,330

2 Claims. (Cl. 180—9.1)

This invention provides a construction for track-laying vehicles, and is particularly intended for use in connection with special purpose tractors designed for the cultivation of certain types of crops. The cultivation of soft ground or muck does not require an excessive amount of drawbar horsepower, but does require the ability to remain upon the surface of the soil rather than either becoming bogged down or generating such excessively deep ruts as to endanger the drainage system or the crops themselves. It is therefore necessary to provide such cultivating machinery with a large load-carrying area in order to generate the required pulling, and also assure that the weight of the tractor will be adequately supported. Since many crops which are planted and cultivated in soft ground are very carefully located in rows and spaced within the rows, it is also necessary that the cultivating machinery be adapted to closely control the positions of the various cultivating tools, and in no way interfere with the visibility of the same by the operator. Tractors designed for use with cultivating machinery will be used when the plants are in the growing process, and hence must be designed to straddle one or more rows of plants; and whatever wheels or supporting means are used must be adapted to travel between these rows and not injure the plants on either side. Since varying types of crops will require varying row spacings, the necessity is frequently present for making adjustment to the width of the "track" of the vehicle (the distance between the wheels or treads on one side and those on the other) in order to adapt the machine for the particular requirements at hand.

The use of continuous tracks to support vehicles of varying descriptions has long been known, and the use of varying-width cultivating machinery is also not new. The present invention adapts the track-laying principle to a particular type of tractor in such a manner that a very simple construction results which can be manufactured and assembled with a minimum in capital outlay and overall cost. The very simplicity and the use of standard shapes for construction members makes the repair and replacement of parts in this machine a task which can be performed by anyone fairly skilled in the handling of tools, and does not require a great variety of factory-formed parts. The present invention, in many cases, enables the use of large components which are taken bodily from other types of standard machinery and are used in such a manner that little or no rework or modification is necessary.

The vehicle is built upon an essentially simple rectangular framework which provides a platform establishing the relationship of the various components involved. The forward section of the vehicle is in many ways similar to the usual tractor of the light-duty variety. A pair of front wheels are mounted upon the front section of the frame, and suitable steering mechanism associates a steering wheel with these front wheels so that the tractor may be controlled in the conventional manner. At the rear portion of the tractor, a small air-cooled gasoline engine is preferably mounted with a belt drive establishing a torque transfer over to a standard automobile transmission. The gear shift which is normally associated with such a transmission is connected to a pushrod, and the pushrod is associated with a manual control lever the movements of which serve to establish the gear relationships of the transmission.

The torque output of the transmission is transferred to a differential unit arranged to drive two separate coaxial shafts, one extending to each side of the vehicle. At the outer end of these shafts arrangements are made for the transfer of the torque to a sprocket supporting one section of the treads.

A transverse beam is preferably attached at the rear portion of the main framework of the tractor, the function of this beam being to support the wheel and track units. Preferably the lateral position of the track units is adjustable to accommodate the tractor for varying row-spacings. A vertical leg is clamped in any given position upon this transverse beam, and at the lower extremity of this leg a pivoted beam is disposed in a fore and aft direction with a track-guiding wheel at each end. The endless track passes under both of these wheels, and also around the driving sprocket noted above. The entire assembly of these components is preferably fixed with respect to the vertical leg, and the leg is movable in a direction parallel to the transverse beam. The driving sprocket is splined to the shaft carrying it in order to remove the necessity of moving the entire shaft as the lateral adjustment of the track assembly is effected.

Means are provided in connection with the pivoted wheel-carrying beams for making adjustment to tighten the endless tracks, and biasing means are also provided tending to rotate the beam in a direction so as to raise the front wheel. This biasing arrangement gives highly desirable characteristics when operating in soft or rough ground. Suitable stops are provided for limiting the rotation of the wheel-carrying beam with respect to the vertical leg.

The steering of a tractor which utilizes the endless track principle is rendered somewhat troublesome unless means are provided for modifying the driving relationship between the treads on opposite sides of the vehicle. The purpose of the differential interposed between the transmission and the driving sprockets for the track units is to enable relative movement to take place between the track units on either side of the vehicle. To facilitate the steering, selective braking is applied to either one of the tracks, with the braking being automatically established by the turning of the steering wheel. In this manner the turning of the tractor is performed with considerable less effort on the part of the operator, and a much lighter lateral load is generated at the front wheels. This, of course, requires much less disturbance of the ground due to the angle between the front wheel and the direction of travel.

Since the motor of a tractor constructed according to the preferred form of the present invention drives the transmission through a belt system, means are preferably provided for tightening the belt, and also for moving the components to a position in which the belt is easily removed and replaced. Due to the movement of the motor with respect to the frame, a mechanism for the control of the various functions of the motor must be provided which will permit this movement without disturbing the degree of control that is necessary. The control of the throttle presents no particular problem; but since the clutch requires a considerable mechanical operation in order to manipulate it, a particular linkage has been developed in order to perform this function. A fixed bracket is provided which moves with the motor, and the bracket provides the support for a pivoted clutch-engaging yoke. Motion is transmitted to the yoke by means of an engagement with the forked end of a bell crank. The movement of the motor causes a projection upon the yoke to move within the confines of the fork, while still permitting angular rotation of the bell crank to control the movement of the yoke. A pushrod extending to a point where it can be conveniently operated by the driver of the tractor establishes the movement of the bell crank.

The various features of the present invention will be analyzed in detail by a discussion of the particular embodiments which are illustrated in the accompanying drawings. In these drawings, Figure 1 is a side elevation of a tractor constructed according to the present invention.

Figure 1:
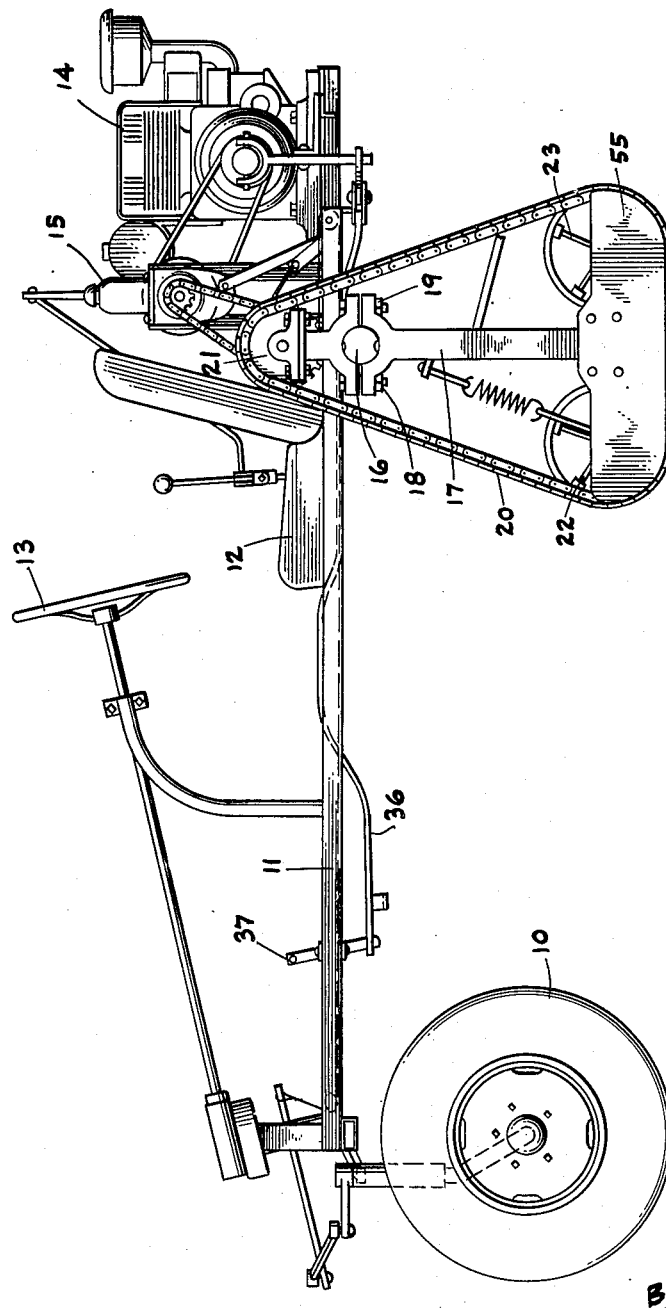

Referring to Figure 1, a tractor is shown having the front wheels 10, the frame 11, the operator's seat 12, and the steering wheel 13. At the rear portion of the frame 11, means are provided for mounting the air-cooled gasoline motor 14, the transmission unit 15, and the transverse beam 16. Preferably, the beam 16 is round in cross-section in order to provide the best form for the clamping action which takes place between the vertical beam assembly 17 and the beam 16 in order to laterally position the assembly. The clamping effect is provided by the bolts 18 and 19 in the view shown in Figure 1 for the left hand wheel and track assembly, and similar means are provided on the opposite side of the vehicle if it is desirable to make both sides movable. In the usual case, one of the wheel and track assemblies will be permanently fixed with respect to the horizontal beam 16, and the other will be constructed according to the view shown in Figure 1.

The wheel and track assembly serves to guide the endless track 20 through the positioning effect of the sprocket 21 and the wheels 22 and 23.

Figure 2:
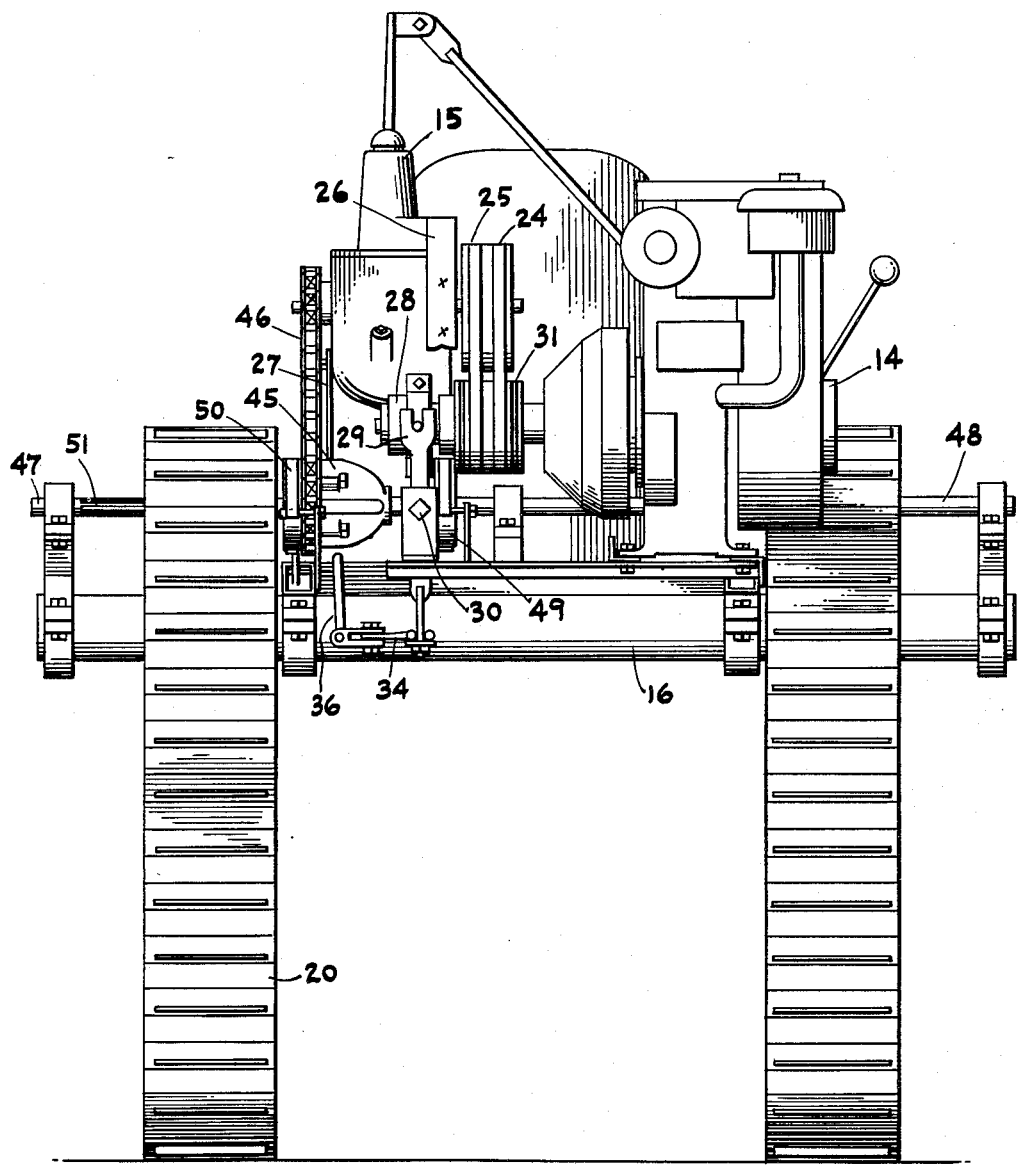
Figure 2 is a rear elevation on a somewhat larger scale of the same device shown in Figure 1.
Figure 5:
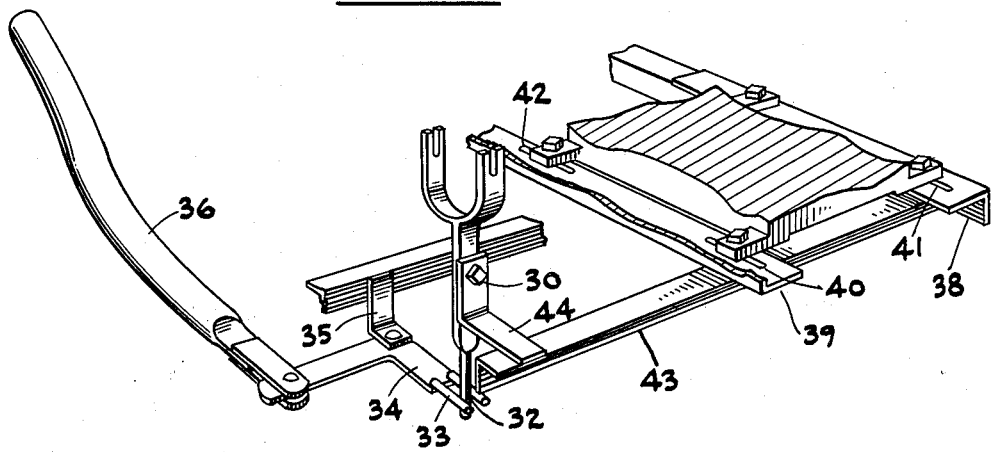
Figure 5 is a view showing the clutch control linkage and the motor mounting.

Referring to Figure 2, the motor 14 is shown driving the transmission 15 by means of the belts 24 and 25. The transmission 15 is supported upon the frame 11 by means of the braces 26 and 27 which are shown broken away in Figure 2 for clarity in order not to obscure other features of the arrangement. The clutch unit associated with the motor is generally indicated at 28, and is controlled by the action of the yoke 29. The yoke 29 is pivoted at the point 30 as is best seen in Figure 5. Being mounted upon the pivot at 30, the yoke member rotates in a transverse plane with respect to the path of motion of the tractor, and causes the engagement and disengagement of the clutch. The movement of the yoke 29 is caused by the engagement of the lower extension 32 which is controlled by the fork 33 in the bell crank 34. The bracket 35 is fixed with respect to the frame 11, and rotatably supports the bell crank for rotation under the urging of the pushrod 36 which is under the control of the operator through the means of the foot pedal 37 as shown in Figure 1. The fixed members 38 and 39 are securely attached to the frame 11, and are provided with the slots 40, 41 and 42 (with another slot not shown in Figure 5) in order to firmly hold the motor in position and yet permit the fore and aft movement required to tighten the belts 24 and 25 or provide for the removal of the same. When the required positioning of the motor 14 has been effected, the bolts passing through the slots are securely tightened and further movement of the motor is prevented. The movement of the motor carries with it the transverse beam 43, and the bracket 44 carrying the clutch operating yoke is accordingly moved with the motor.

The torque supplied to the transmission by the mechanism described above is converted to the desired torque and speed ratio, and then supplied to the differential unit 45 by means of the chain 46 and suitable sprockets. The shafts 47 and 48 are driven by the differential unit 45, with the relative rotation between the two shaft sections controlled by the brakes 49 and 50. The shaft 47 can be splined as indicated at 51, and conventional bearing blocks are provided for supporting the shaft sections as indicated.

Figure 6:
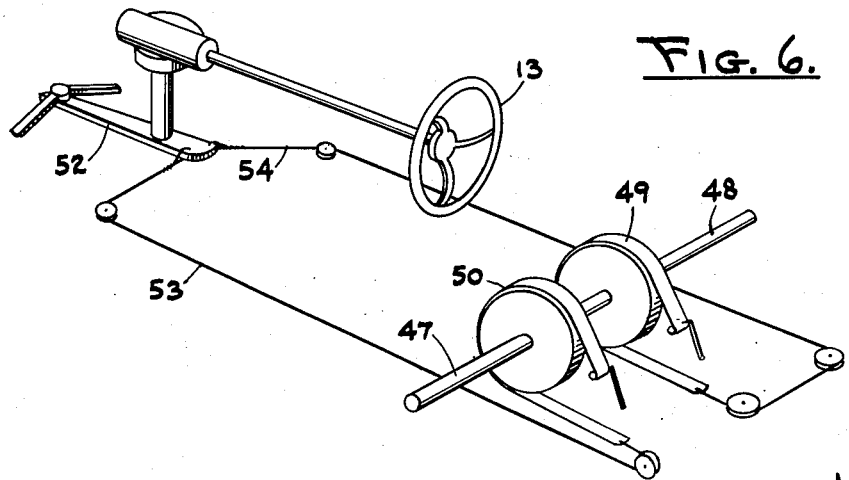
Figure 6 is a schematic diagram showing the selective braking system and its relationship with the steering mechanism.

The selective braking system for facilitating the steering of the tractor is best shown in Figure 6. The steering wheel 13 induces rotation of the arm 52, the front end of which is associated with the front wheels by means of the usual linkage. At the rear portion of the arm 52, the cables 53 and 54 are attached, and pulleys are appropriately located to lead these cables back to the brake units 49 and 50 with which they are individually associated. It will be seen that the rotation of the steering wheel causing the front wheel to turn to the left will cause an increase in the braking of the unit 50, and will slow down the left hand wheel and track assembly in order to enable the turn to be made with a minimum amount of side thrust generated by the front wheel 10.

Figures 3, 4:
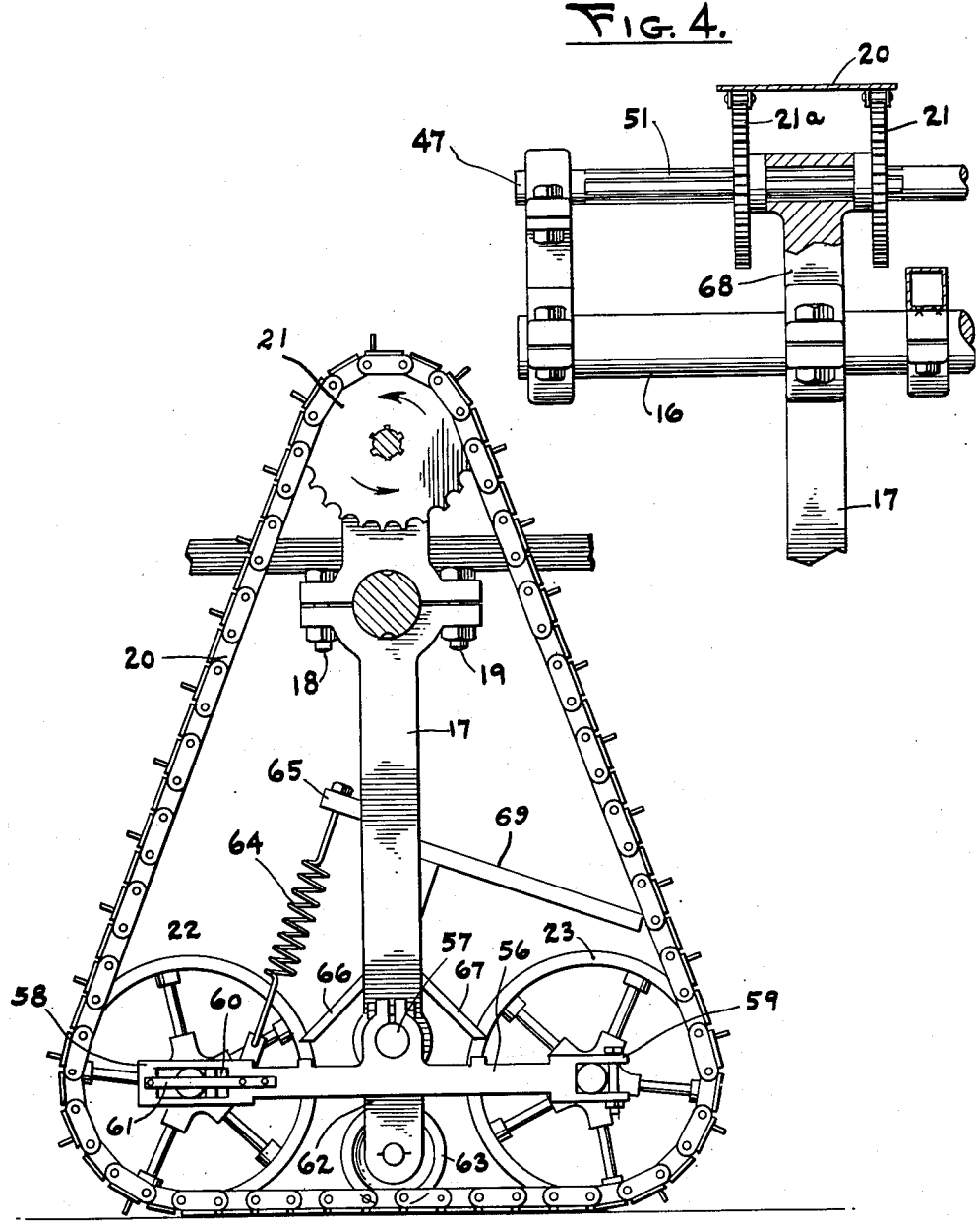
Figure 3 is an enlarged side elevation of the track and wheel assembly shown in Figure 1, with certain of the parts removed in order to better illustrate the mechanism.
Figure 4 is a view showing the relationship between the slideable vertical leg and the drive shaft, including the supports for the upper sprocket.

The construction of the wheel and track assemblies is best shown in Figure 3. In this view, the side plate 55 is removed in order to show more clearly the mechanism used to support the wheels. The beam 56 is pivotally connected to the lower end of the vertical beam 17 at the point 57. A takeup arrangement is provided at this bearing in order to control the amount of looseness and to minimize the amount of wobble between the track unit and the vehicle itself. The wheels 22 and 23 are carried upon suitable shafts which are retained in position by means of the forks 58 and 59. Similar forks (not shown) are located on the opposite sides of the wheels 22 and 23 in order to complete the support of the respective shafts. The wheels 22 and 23 are of such a width as to fit between the link members of the chain 20, and position the same laterally. The forward fork 58 is extended a sufficient length to provide for fore and aft adjustment of the position of the wheel 22 in order to tighten the endless track 20 as required. Tightening is effected by inserting one or more blocks 60 behind the shaft carrying the wheel 22, and the retaining strap 61 holds these blocks in position. At the central portion of the beam 56, a bracket 62 is provided carrying the wheel 63. This wheel supports the central portion of the track 20, and increases the load-carrying ability of the chain without greatly increasing the tension thereon.

The spring 64 is connected between a point on the forward portion of the beam 56 and a fixed point 65 upon the vertical beam 17 in order to bias the beam 56 in a clockwise direction. The stops 66 and 67 are positioned as shown to limit the amount of rotation which is permitted to the beam. The side plates 55 and their opposite members are secured to the assembly shown in Figure 3 by suitable bolts passing around the beam 56 and securing the plate in position through the clamping effect of these bolts.

Referring to Figure 4, the arrangement for supporting the drive sprockets with respect to the vertical beam 17 is illustrated. A bearing block 68 is bolted to the upper portion of the vertical beam 17, and provides a bearing for the shaft 47, and also positions the sprockets 21 and 21a.

It has been found desirable to provide the scraper 69 shown in Figure 3 to remove accumulations of dirt or foreign material from the track 20. These members prevent such material from interfering with the operation of the sprocket 21.

The particular embodiments of the present invention which have been illustrated in the accompanying drawings and described herein are not to be considered as a limitation upon the scope of the appended claims. In these claims it is the intent of the inventor to claim the entire scope of the invention to which he is entitled in view of the prior art.

I claim:
1. In combination with a vehicle having a frame and a motor mounted above said frame: horizontal beam means mounted transversely to said frame; vertical beam means mounted at an intermediate point thereon at opposite sides of said frame on said horizontal beam means, said vertical beam means on at least one side being adjustable along said horizontal beam means; endless track systems carried by each of said vertical beam means including track sprocket means rotatably mounted on the upper end of said vertical beam means above and on an axis parallel to said transverse beam means, track-guiding means disposed at the lower end of said vertical beam means, and endless track means positioned by said track sprocket and guide means; a drive shaft rotatably mounted in bearings coaxially with said track sprocket means at a position axially fixed with respect to said transverse horizontal beam means, said drive shaft having driving engagement with at least one of said track sprocket means; and power-transfer means connecting said motor and drive shaft.

2. In combination with a vehicle having a frame and a motor mounted above said frame: horizontal beam means mounted transversely to said frame; vertical beam means mounted at an intermediate point thereon at opposite sides of said frame on said horizontal beam means, said vertical beam means on at least one side being adjustable along said horizontal beam means; endless track systems carried by each of said vertical beam means including track sprocket means rotatably mounted on the upper end of said vertical beam means above and on an axis parallel to said transverse beam means, track-guiding means disposed at the lower end of said vertical beam means, and endless track means positioned by said track sprocket and guide means; and a drive shaft rotatably mounted in bearings coaxially with said track sprocket means at a position axially fixed with respect to said transverse horizontal beam means, said drive shaft having spline engagement with said track sprocket means on said side at a point between said bearings; and power-transfer means connecting said motor and drive shaft.

JOE LUDEMA.

REFERENCES CITED

The following references are of record in the file of this patent:

UNITED STATES PATENTS

| Number | Name | Date |
|---|---|---|
| 1,105,862 | Strait | Aug. 4, 1914 |
| 1,400,690 | Lewis | Dec. 20, 1921 |
| 1,641,813 | Johnston et al. | Sept. 6, 1927 |
| 1,771,625 | Halleck | July 29, 1930 |
| 2,467,947 | Skelton | Apr. 19, 1949 |
| 2,535,762 | Tapp et al. | Dec. 26, 1950 |

FOREIGN PATENTS

| Number | Country | Date |
|---|---|---|
| 40,430 | France | Mar. 29, 1932 |